United States Patent

Wake

[11] Patent Number: 5,949,564
[45] Date of Patent: Sep. 7, 1999

[54] TRANSDUCER

[75] Inventor: David Wake, Suffolk, United Kingdom

[73] Assignee: British Telecommunications Public Limited Company, London, United Kingdom

[21] Appl. No.: 08/051,949

[22] Filed: Apr. 26, 1993

[30] Foreign Application Priority Data

Mar. 1, 1993 [EP] European Pat. Off. .............. 93301563

[51] Int. Cl.$^6$ .................................................. H04B 10/00
[52] U.S. Cl. ............................................ 359/150; 359/145
[58] Field of Search ...................................... 359/145–146, 359/150–151, 173, 189, 195, 171; 379/56; 381/172

[56] References Cited

U.S. PATENT DOCUMENTS

| 4,916,460 | 4/1990 | Powell | 359/145 |
| 5,239,296 | 8/1993 | Jenkins | 359/145 |

FOREIGN PATENT DOCUMENTS

| 0143854 | 11/1980 | Japan | 359/145 |
| 8804868 | 6/1988 | WIPO | 359/171 |
| WPO-A | | | |
| 8804868 | 6/1988 | WIPO . | |
| 2010046 | 6/1992 | WIPO | 379/56 |

OTHER PUBLICATIONS

Pozar et al. "Microstrip Antennas with Integrated Fiber Optic Feeds", Electronics Letters, Oct. 25, 1990, vol. 26, No. 22, pp. 1889–1891.

Wake et al., "Electronics Letters", Jun. 6, 1991, vol. 27, No. 12, entitled "50 GHz InGaAs Edge–Coupled Pin Photodetector".

Wake et al., "Electronics Letters", Oct. 8, 1992, vol. 28, No. 21, entitled "Video Transmission Over a 40GHz Radio–Fibre Link".

Primary Examiner—Kinfe-Michael Negash
Attorney, Agent, or Firm—Nixon & Vanderhye P.C.

[57] ABSTRACT

A transducer for use in a hybrid optical and radio communications system includes a zero electrical power photodetector and a radio antenna. The photodetector is electrically connected to the radio antenna so that, in use, optical signals are received and radio signals are transmitted by the transducer without the use of electrical power. The transducer can thus be remotely sited at locations in communications systems not having a supply of electrical power. In a first embodiment the photodetector includes a zero-bias photodiode, and in a second embodiment the transducer includes a self-biasing photodetector.

26 Claims, 4 Drawing Sheets

TRANSDUCER

BACKGROUND OF THE INVENTION

1. Field of the Invention

The present Invention relates to a transducer, and in particular to a transducer suitable for use in a hybrid optical and radio communications system.

2. Related Art

Hybrid optical and radio communications systems, and in particular radio-fibre systems are expected to find an increasing role in telecoms networks over the next decade due to their ability to combine the flexible and low cost distribution afforded by optical transmission with 'wireless' radio transmission in areas such as personal mobility or antenna remoting.

Demand for broadband services to the home and to small businesses is expected to increase dramatically over the next decade. Optical fibre and millimetre-wave radio are both capable of supporting the large bandwidth requirements associated with these services. Running fibre direct to the home or business is one way of providing high capacity, but for operational reasons this is not always an appropriate solution. Alternatively millimetre-wave radio systems, such as the RACE Mobile Broadband system or radio LANs, are flexible and offer the advantage of expedient provision. It is likely, therefore, that a hybrid network comprising both radio and fibre will play a significant role in early broadband local-access systems.

Such a hybrid optical and radio system is described in Wake, D., Smith, I. C., Walker, N. G., Henning, I. D., and Carver, R. D. 'Video transmission over a 40 GHz radio-fibre link', Electron. Lett., 28, 1992, pp 2024–2025, and also in Smith, I. C., and Ellis, B. J.: 'A wideband mm-wave fibre-fed radio distribution point demonstrator'. ICC'92 Conference Record, 1992, pp. 100–104

Necessarily in these systems while some equipment, particularly the bulky and expensive equipment, may be located in a central benign environment, other equipment, particularly the optical to radio transducer, must be located remotely. The requirements demanded of any remotely sited equipment are severe for example in terms of cost, size, weight, frequency stability and power consumption, and because in any practical system there will be many more remote sites than central sites, progress in meeting the requirements of remotely sited equipment limits the deployment of these systems.

SUMMARY OF THE INVENTION

An object of the present invention is to provide an improved transducer for use in hybrid optical and radio communications systems.

According to the present invention there is provided a transducer for use in a hybrid optical and radio communications system, the transducer comprising:

a zero electrical power photodetector, and a radio antenna, the photodetector being directly electrically connected to the radio antenna so that in use optical signals are received and radio signals are transmitted by the transducer without the use of electrical power.

The present invention is based on the applicant's realisation that a zero electrical power photodetector can, surprisingly Le directly electrically connected to a radio antenna to give a transducer which operates with no electrical power supply. Thus a transducer according to the present invention can be remotely sited for example in the local access network at a site having no electrical power supply, for example at the top of a telegraph pole serving a number of customers in a particular street. The optical signals arriving at the transducer from a central site, for example via an optical fibre, are converted to electrical signals and retransmitted as radio signals via the radio antenna, without the use of externally supplied electrical power. The radio signals are subsequently received at a third site, for example the customer's premises, and are there demodulated.

A transducer according to the present invention can thus be remotely sited at locations not having an electrical power supply. Furthermore the design of the transducer is considerably simplified allowing for example a simple fibre-in antenna-out arrangement.

The prior art transducer comprising an electrically powered photodetector formed from a monolithically integrated optical preamplifier and photodiode, described by Wake et al in the above referenced paper, can thus be replaced by a transducer according to the present invention to allow more flexible remote siting.

Preferably the zero electrical power photodetector comprises a zero-bias photodiode. Photodiodes require an electric field between their contacts which is sufficient to cause photogenerated carriers to drift to the contacts with saturated velocity. Zero-bias photodiodes are designed so that an adequate internal electric field is generated by using only the built-in junction potential, so that an external biasing voltage is not required, thus enabling their operation without the provision of electrical power to them. Such zero-bias photodiodes are known for example from Wake, D. , Spooner, T. P. , Perrin, S. D. , and Henning, I. D. : '50 GHz InGaAs edge-coupled pin photodetector', Electron. Lett. , 27, 1991, pp1073–1074 and J. E. Bowers, C. A. Burrus, 'High-speed zero-bias waveguide photodetectors, Electron. Lett., vol.22, No.17, 14.8.86.

Preferably the zero-bias photodiode is an edge-coupled PIN photodiode. Use of this geometry, in which the optical input to the photodiode is substantially perpendicular to the electric field across the absorber layer, allows the photodiode to achieve both high speed operation, requiring a low capacitance, and moderately high quantum efficiency. These two conflicting aims can be meet since the absorber layer in an edge-coupled photodiode can be thin enough to give a short carrier transit distance, while being long enough to have little effect on the internal quantum efficiency.

Preferably the transducer comprises a contact layer provided to facilitate ohmic contact to the photodiode. Provision of a contact layer is important for a zero-bias photodiode since if the electrical contacts made to the photodiode are not ohmic, i.e. if they create a contact potential, then such a potential will oppose the effect of the internal junction potential and may render the zero-bias photodiode inoperative.

Preferably in the edge-coupled PINS photodiode the absorber layer is less than 0.5 $\mu$m thick, more preferably less than 0.2 $\mu$m thick, still more preferably less than 0.15 $\mu$m thick, and most preferably substantially 0.13 $\mu$m thick. A particularly thin absorber layer allows an adequate internal electrical field to be generated from the junction potential alone, obviating the need for external biasing of the photodiode.

As an alternative to the use of a zero-bias photodiode, the zero electrical power photodetector can comprise a self-biasing photodetector. Such a self-biasing photodetector employs part of the input optical power to the transducer to provide an electrical bias for the photodetector. Thus again a transducer is provided having only an optical input and a radio output, with no electrical power supplied.

Advantageously the self-biasing photodetector comprises a first biased photodiode, a second biasing photodiode in electrical contact with the first photodiode, and optical distribution means, the arrangement being such that in use the optical distribution means distribute optical signals, input to the transducer, to illuminate both photodiodes, and the photogenerated current of the second biasing photodiode is directed to bias the first biased photodiode.

The self-biasing photodetector employs some of the incident optical power to bias the first photodiode, and thus has a higher output power saturation than the zero-bias arrangement, because the first photodiode may be optimally biased. Preferably the photocurrent generated in each of the first and second photodiodes is substantially the same for optimum operation of the self-biasing photodetector.

Preferably the first biased photodio:de of the self-biasing photodetector comprises a low capacitance, high-speed photodiode and the second biasing photodiode comprises a high capacitance low speed photodiode, so that the electrical output of the second biasing photodiode is substantially unaffected by modulation of the input optical signals, and the electrical output of the first biased photodiode closely follows modulation of the input optical signals.

This arrangement enables the second photodiode to provide a substantially DC, optimised bias current to the first photodiode which has been specifically designed for high speed, high responsivity operation.

Preferably the optical distribution means of the self-bias photodetector is wavelength selective, for example comprising a wavelengh selective fused tapered coupler. Such a transducer can be employed in a communications system in which optical signals are supplied to the transducer at two different wavelengths, the signals at a first wavelength being modulated to carry Information and being directed to the first photodiode by the wavelength selective optical distribution means, and the signals at a second wavelength being unmodulated and being directed to the second photodiode. This arrangement has the advantage that the responsivity of the self-biasing photodetector in relation to the information carrying input optical power is not reduced, relative to the zero-bias arrangement, since none of the information carrying optical input power is employed to bias the first photodiode.

Preferably the first and second photodiodes of the self biasing photodetector are monolithically integrated to give a compact design.

BRIEF DESCRIPTION OF THE DRAWINGS

Embodiments of the present invention will now be described, with reference to the accompanying figures, in which.

DETAILED DESCRIPTION OF EXEMPLARY EMBODIMENTS

Figure 1:
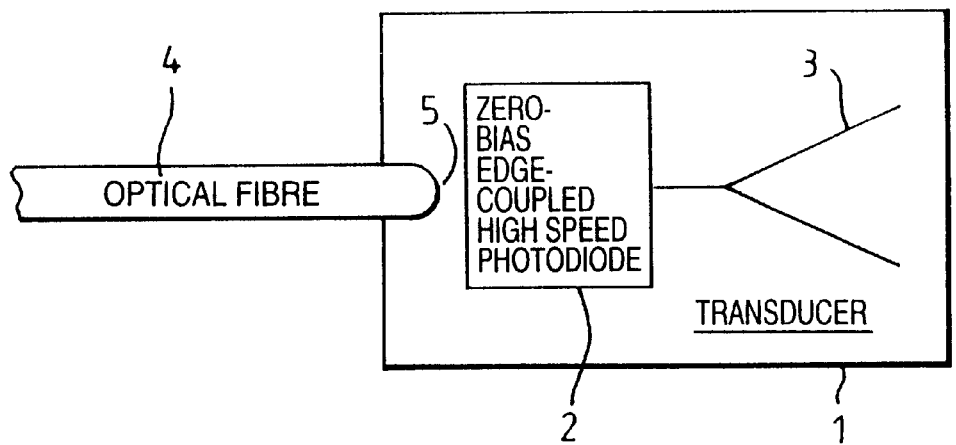
FIG. 1 is a schematic representation of a transducer according to a first embodiment of the present invention.

FIG. 1 shows a transducer comprising a zero-bias edge-coupled high speed photodiode 2, directly electrically connected to a standard gain horn antenna 3. Optical signals are input to the transducer via single mode optical fibre 4 having a standard 12 $\mu$m radius lens 5.

Photodiode 2 is of the type described in Wake, D., Spooner, T. P. , Perrin, S. D., and Henning, I. D. '50 GHz InGaAs edge-coupled pin photodetector', Electron. Lett. , 27, 1991, pp1073–1074, the disclosure of which is hereby incorporated within the present application by reference.

Figure 2:
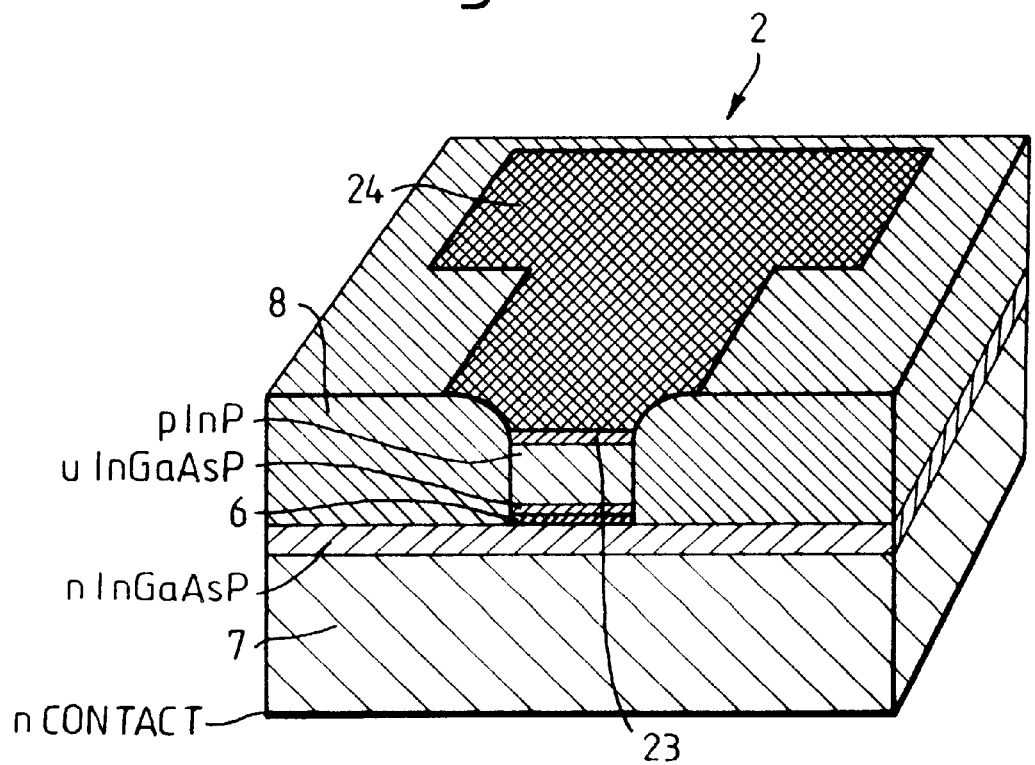
FIG. 2 shows a zero-bias photodiode of the transducer of FIG. 1.
Figure 3:
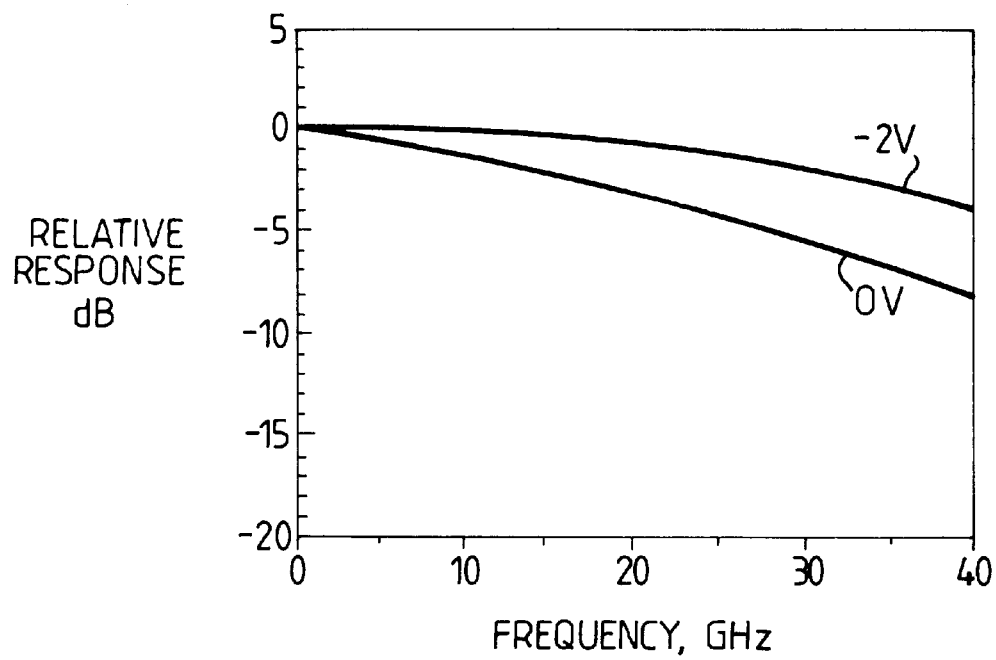
FIG. 3 is a araph of the frequency response of the photodiode of FIG. 2 at a photocurrent of 0.1 mA for bias levels of 0 V and −2 V.

With reference to FIG. 2 the photodiode 2 comprises an InGaAs absorber layer 6 having a length of 10$\mu$m, a width of 5 $\mu$m, and a thickness of 0.13$\mu$m. The structure is grown by MOVPE on a sulphur-doped InP substrate 7 and mesa etching is used to define the grown-in p-n junction. A 4 $\mu$m thick dielectric layer 8 (polyimide) is used to reduce bond-pad capacitance. For operation at zero bias, special care must be taken to ensure that the photodiode contacts are as close to ohmic behavior as possible since any contact potential will obstruct current flow. A contact layer 23 is thus included to reduce any potential barrier at the p-side contact 24. This contact layer 23 consists of highly p-doped InGaAs ($N_a > 1E19 cm^{-3}$), and has a thickness of 0.1 $\mu$m. The photodiode 2 is then mounted on a package incorporating a Wilton K-connector to allow characterization up to a frequency of 40 GHz. Although leakage current is not an important parameter for zero bias operation, values less than 1nA at −2 V are typical. An external quantum efficiency of 46% was measured for the photodiode 2 at a wavelength of 1556 nm,. Measurement of the frequency response was performed using an optical heterodyne technique, in which the beat frequency was sweet by current tuning one of a pair of DFB lasers at a wavelength around 1556 nm, and the electrical output power from the photodiode was measured using a broadband power sensor. The frequency response is shown in FIG. 3 for bias voltages of 0 V and −2 V and with optical power set to give a photocurrent of 0.1 mA. The photodiode 2 had a 3 dB bandwidth of 37 GHz at a bias of −2 V, and the penalty incurred for zero bias operation ranged from less than 0.5 dB at 0.1 GHz to 4 dB at 40 GHz.

Figure 4:
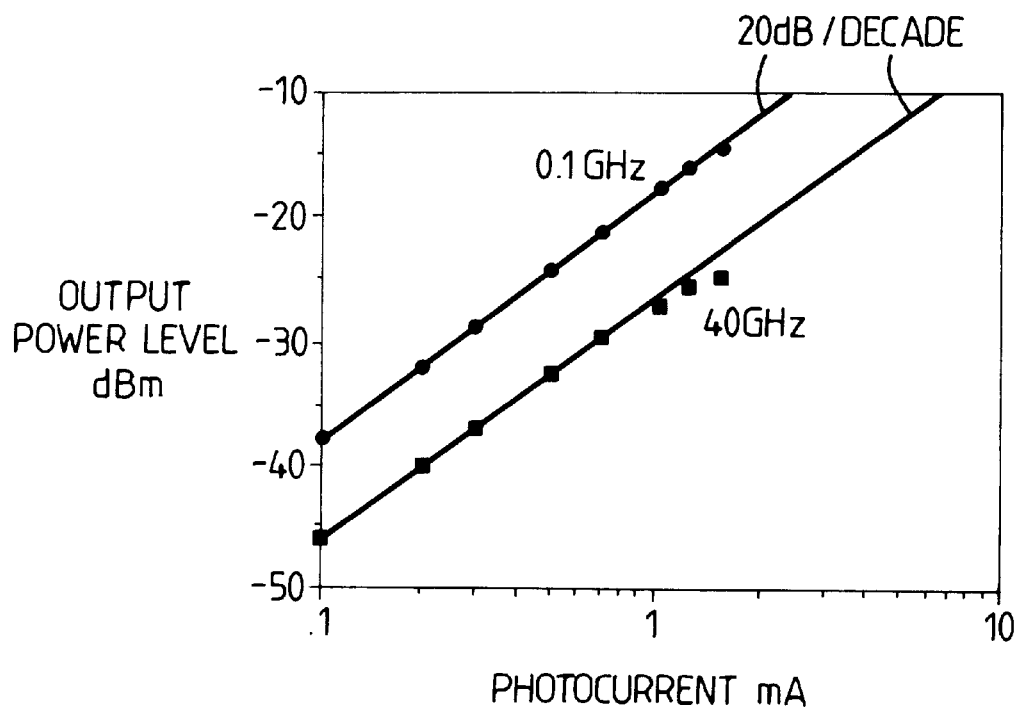
FIG. 4 is a graph of the zero-bias output power of the photodiode of FIG. 2 as a function of photocurrent for frequencies of 0.1 GHz and 40 GHz.

A concern when using high input optical power levels is that they can degrade the response of high speed photodiodes. To evaluate this possibility, measurements were performed over a range of optical powers sufficient to generate photocurrents up to 1.5 mA. No degradation in quantum efficiency was observed up to this maximum photocurrent when the photodiode was biassed at −2 V over the range 0.1–40 GHz. The output power as a function of photocurrent for zero bias operation is shown in FIG. 4 for frequencies of 0.1 GHz and 40 GHz. The solid lines indicate a slope of 20 dB/decade, and were positioned. to coincide with the low photocurrent data points. The difference in output power (for the case of low photocurrent) at the two frequencies was 8 dB as expected from FIG. 3. At 0.1 GHz no degradation in quantum efficiency was observed up to the maximum photocurrent. At 40 GHz there is evidence of output power saturation above a photocurrent of 1 mA. At the maximum photocurrent of 1.5 mA, the extra penalty incurred due to the high input power level was 2 dB, giving a total penalty of 10 dB with respect to low frequency and low power.

Figure 5:
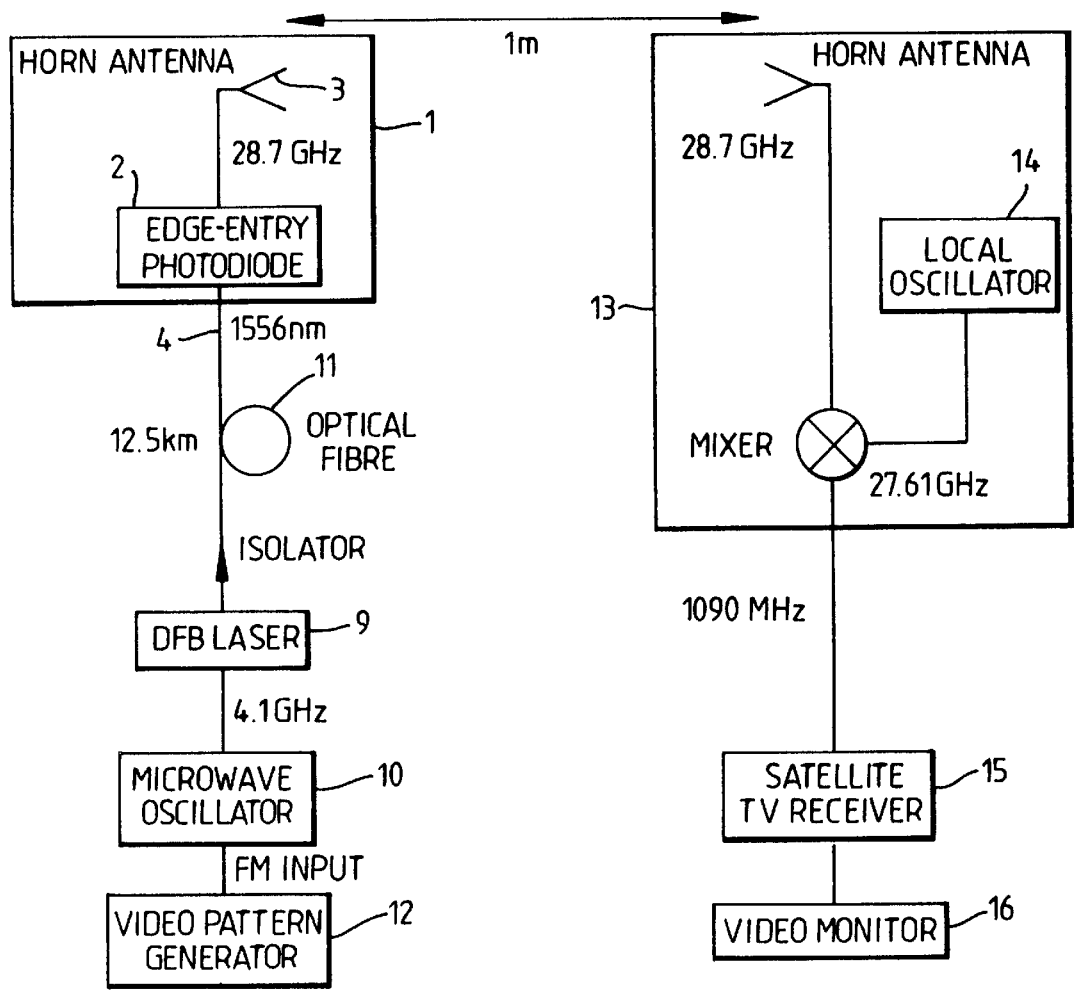
FIG. 5 is a schematic representation of a 29 GHz radio-fibre system employing the transducer of FIG. 1.

The transducer 1 was used in a radio-fibre communications system shown in FIG. 5. A three-contact DFB laser 9, optimised for high FM response is driven by a 4.1 GHz microwave oscillator 10. The resulting optical FM was converted to IM at harmonics of the drive frequency by phase perturbation of the optical FM sidebands resulting from the dispersion caused by 12.5 km of step index fibre 11. This technique results in a mm-wave carrier signal of spectral purity determined by that of the microwave oscillator 10, which in this case had subHz linewidth. Modulation is applied by connecting a video signal from a video pattern generator 12 to the FM input of the microwave oscillator 10. The resulting optical signal was detected by the zero-bias edge-coupled photodiode 2 of the transducer 1, and then retransmitted as a radio signal via the standard gain horn antenna 3. No electrical power was supplied to the transducer 1. After a path length of 1 m, the 7th harmonic (at 28.7 GHz) of the drive signal was selected using a radio receiver 13 having a local oscillator 14 operating at a frequency of 27.61 Ghz. The resulting IF (at 1090 MHz) was demodulated using a satellite TV receiver 15, and displayed on a monitor 16. the high quality of the displayed image adequately demonstrated the success of zero electrical power transducer transmission.

The short radio path in this system was necessary as a result of the low radiated power level (−50 dBm) from the transducer. The main reason for the low power level was the relative inefficiency of the optical mm-wave generation process. An optical modulation depth of only ~20% was observed (rather than the theoretically predicted 70%) due to significant intensity modulation at the output of the laser 9. A good indication of the potential power levels achievable with a zero electrical power transducer using a more efficient means of optical mm-wave generation can be obtained from FIG. 4, which shows that a transmitted radio power of at least −25 dBm at 40 GHz is possible. With this power level, a radio path of a few hundred metres is achievable, which is adequate for many potential applications.

Figure 6:
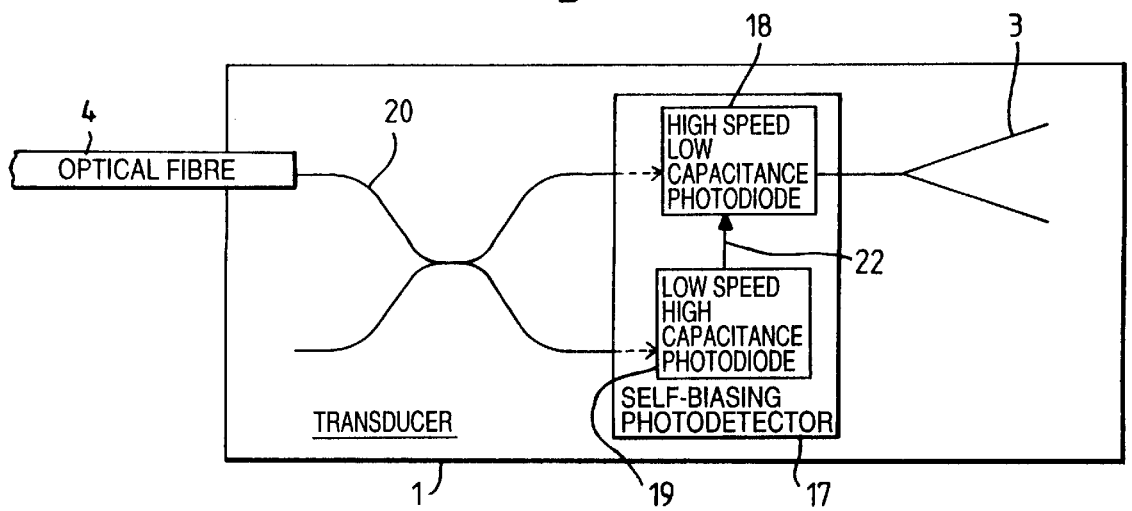
FIG. 6 Is a schematic representation of a transducer according to a second embodiment of the present invention.

FIG. 6 shows a second embodiment of the present invention comprising a transducer 1 having a self-biasing photodetector 17 formed from a high speed, low capacitance photodiode 18, directly electrically connected to a standard gain horn antenna 3, and a low speed, high capacitance photodiode 19, and optical distribution means comprising a 3 dB fused tapered coupler 20.

In operation optical signals input to the transducer 1 via the optical fibre 4 are distributed to both the high speed photodiode 18 and the low speed photodiode 19 by the coupler 20. The optical signals impinging on low speed photodiode 19 generate a photocurrent which is directed by electrical connection 22 to high speed photodiode 18. Electrical connection 22 serves to connect photodiodes 18 and 19 in parallel, so that the anode of one is connected to the cathode of the other, and vice versa. Because of the high capacitance of photodiode 19 the photocurrent generated therein is substantially a DC current.

The quantum efficiencies of the photodiodes 18 and 19 are arranged to be substantially equal so that given equal distribution of the optical input power between the photodiodes 18, 19 by the optical distribution means 20, substantially equal photocurrents are generated in photodiodes 18 and 19.

Thus, since photodiode 18 is optimally biased by the photogenerated current from photodiode 19 the output power saturation of a zero-electrical power transducer according the second embodiment of the present invention is improved with respective to that of a transducer according to the first embodiment of the present invention.

Figure 7A:
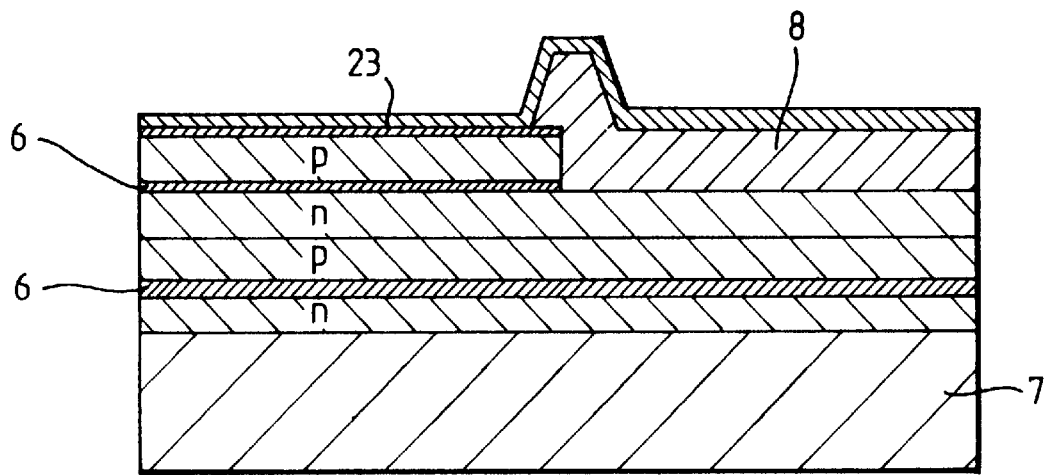
FIG. 7(a) and 7(b) are schematics of a monolithically integrated self-biasing photodetector according to the second embodiment of the present invention, shown in longitudinal cross-section in 7(a) and in lateral cross-section in 7(b).
Figure 7B:
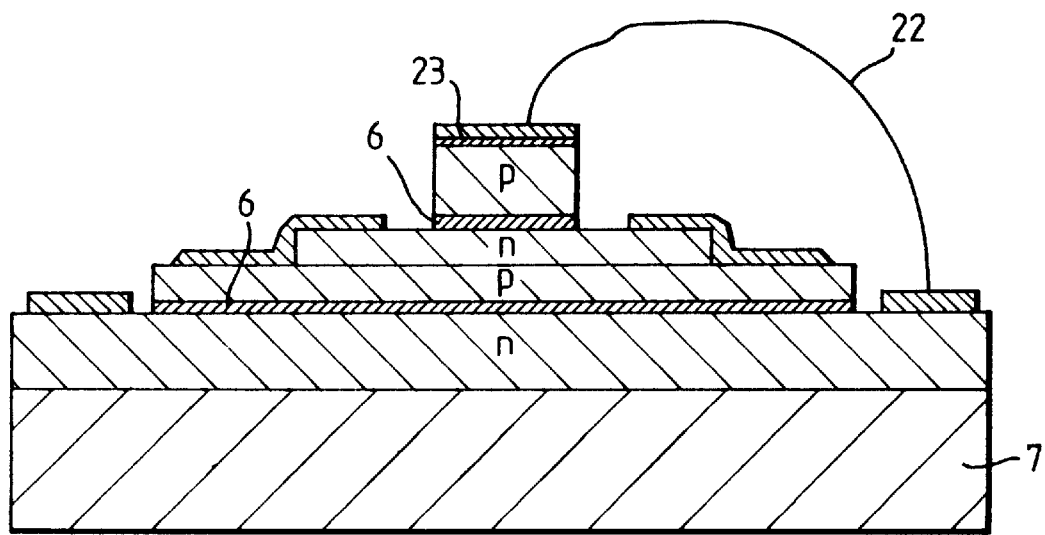

FIG. 7 (a) and 7(b) show a monlithically integrated self-biasing photodetector comprising two edge-coupled PIN photodiodes grown one on top of the other. As can be seen the lower photodiode has a larger area absorber layer 6 and thus forms the high capacitance, low speed biasing photodiode 19, while the upper photodiode has a smaller area absorber layer 6 and forms the low capacitance, high speed photodiode 18.

Although the first embodiment of the invention has been described in relation to an edge-coupled PIN photodiode, the skilled person will appreciate that the zero-bias photodiode of the invention may comprise any photodiode having a built in electric field, for example a Schottky photodiode or a metal-semiconductor—metal photodiode. Similarly the self-biasing photo-detector of the second embodiment of the invention could comprise a photo-conductor or phototransistor in place of the biased photodiode.

I claim:

1. A transducer for use in a hybrid optical and radio commnunications system, the transducer comprising:
   a zero electrical power photodetector, and
   a radio antenna,
   the photodetector being directly electrically connected to the radio antenna so that, in use, optical signals are received and radio signals are transmitted by the transducer without the use of electrical power.

2. A transducer as in claim 1, wherein the photodetector comprises a zero-bias photodiode.

3. A transducer as in claim 2, wherein the zero-bias photodiode is an edge-coupled PIN photodiode.

4. A transducer as in claim 2 or 3, comprising a contact layer provided to facilitate ohmic contact to the photodiode.

5. A transducer as in claim 4, wherein the contact layer is formed of highly p-doped indium gallium arsenide.

6. A transducer as in claim 3 wherein an absorber layer of the photodiode is less than 0.5 $\mu$m thick.

7. A transducer as in claim 6, wherein the absorber layer is substantially 0.13 $\mu$m thick.

8. A transducer as in claim 6, wherein the absorber layer is formed of indium gallium arsenide.

9. A transducer as in claim 1, wherein the photodetector comprises a self-biasing photodetector.

10. A transducer as in claim 9, wherein the self-biasing photodetector comprises:
   a first biased photodiode,
   a second biasing photodiode in electrical contact with The first photodiode, and
   optical distribution means,
   the arrangement being such that, in uses the optical distribution means distribute optical signals, input to the transducer, to illuminate both photodiodes, and photogenerated current of the second biasing photodiode is directed to bias the first biased photodiode.

11. A transducer as in claim 10, wherein photocurrent generated in each of the first and second photodiodes is substantially the same.

12. A transducer as in claim 10 or 11, wherein:

the first biased photodiode comprises a low capacitance, high-speed photodiode, the second biasing photodiode comprises a high capacitance low speed photodiode, the electrical output of the second biasing photodiode being substantially unaffected by modulation of the input optical signals, and the electrical output of the first biased photodiode closely follows modulation of the input optical signals.

13. A transducer as in claim 12, wherein capacitance of the first photodiode is less than 0.2 pF, and capacitance of the second photodiode is greater than 1 pF.

14. A transducer as in claim 10 wherein the optical distribution means is wavelength selective.

15. A transducer as in claim 10 wherein the first and second photodiodes are monolithically integrated.

16. A radio-fibre communications system comprising:

a source of optical signals at a first site, a transducer as in claim 1 or 10 at a second site, a receiving radio antenna at a third site, and an optical fibre coupled at a first end to the optical signal source and at a second end to the transducer, signals generated at the first site being transmitted optically to the second site via the optical fibre, converted at the second site by the transducer from optical signals to radio signals and transmitted as radio signals to the third site where they are received by said receiving radio antenna.

17. A method of transducing optical signals to radio signals in a hybrid optical and radio communications system, the method comprising:

connecting a zero electrical power photodetector directly to a radio antenna, and passing optical signals to said photodetector to transmit corresponding radio signals from the antenna without the use of an electrical power supply.

18. A method as in claim 17, wherein the photodetector comprises a zero-bias photodiode.

19. A method as in claim 18, wherein the zero-bias photodiode is an edge-coupled PIN photodiode.

20. A method as in claim 17, wherein the photodetector comprises a self-biasing photodetector.

21. A method as in claim 20 further comprising:

distributing optical signals, input to the transducer, to illuminate both a first biased photodiode and a second biasing photodiode in electrical contact with the first photodiode, the photogenerated current of the second biasing photodiode being directed to bias the first biased photodiode.

22. A method as in claim 21, wherein photocurrent generated in each of the first and second photodiodes is substantially the same.

23. A method as in claim 21 or 22, wherein the first biased photodiode comprises a low capacitance, high-speed photodiode, and the second biasing photodiode comprises a high capacitance low speed photodiode, the electrical output of the second biasing photodiode being substantially unaffected by modulation of the input optical signals, and the electrical output of the first biased photodiode closely follows modulation of the input optical signals.

24. A method as in claim 23, wherein capacitance of the first photodiode is less than 0.2 pF, and capacitance of the second photodiode is greater than 1 pF.

25. A method as in claim 21, wherein the optical signals are distributed selectively according to wavelength to the first and second photodiode respectfully.

26. A radio-fibre communications method comprising:

coupling signals generated at a first site optically to a second site via an optical fibre, converting said optical signals to radio signals at the second site by connecting a zero electrical power photodetector directly to a radio antenna, and passing optical signals to said photodetector to transmit corresponding radio signals from the antenna without the use of an electrical power supply, and transmitting said radio signals to a third site without wire or fibre where the radio signals are received by a receiving radio antenna.

* * * * *